United States Patent
Brandt et al.

(10) Patent No.: US 8,825,839 B2
(45) Date of Patent: Sep. 2, 2014

(54) SNOOPING DNS MESSAGES IN A SERVER HOSTING SYSTEM PROVIDING OVERLAPPING ADDRESS AND NAME SPACES

(75) Inventors: Mark S. Brandt, Laguna Beach, CA (US); Sandy Hickoff, Irvine, CA (US); Linh Ly, Rancho Santa Margarita, CA (US); Kathryn A. McDonald, Yorba Linda, CA (US); Patricia A. Nichols, Irvine, CA (US); James E. Trevdte, Rancho Santa Margarita, CA (US)

(73) Assignee: Unisys Corporation, Blue Bell, PA (US)

( * ) Notice: Subject to any disclaimer, the term of this patent is extended or adjusted under 35 U.S.C. 154(b) by 323 days.

(21) Appl. No.: 12/953,779

(22) Filed: Nov. 24, 2010

(65) Prior Publication Data
US 2012/0131177 A1 May 24, 2012

(51) Int. Cl.
*G06F 15/173* (2006.01)
*H04L 29/12* (2006.01)

(52) U.S. Cl.
CPC ......... *H04L 61/1511* (2013.01); *H04L 61/2503* (2013.01); *H04L 61/2076* (2013.01); *H04L 61/2015* (2013.01)
USPC ............ 709/224; 709/221; 709/223; 709/245

(58) Field of Classification Search
CPC ..................... H04L 61/1511; H04L 29/12066; H04L 29/12367; H04L 61/2514; H04L 45/00; H04L 45/72; H04L 45/74; H04L 45/42; H04L 61/2015; H04L 61/2535; G06F 2201/815
USPC ......................................................... 709/245
See application file for complete search history.

(56) References Cited

U.S. PATENT DOCUMENTS

| 7,882,169 | B1 * | 2/2011 | Droms et al. | 709/203 |
| 2001/0042134 | A1 * | 11/2001 | Ichiyoshi | 709/245 |
| 2002/0052876 | A1 * | 5/2002 | Waters | 707/100 |
| 2002/0062450 | A1 * | 5/2002 | Carlson et al. | 713/200 |
| 2002/0165982 | A1 * | 11/2002 | Leichter et al. | 709/244 |
| 2004/0210672 | A1 * | 10/2004 | Pulleyn et al. | 709/245 |
| 2004/0249975 | A1 * | 12/2004 | Tuck et al. | 709/245 |
| 2005/0086377 | A1 * | 4/2005 | Aso | 709/245 |
| 2009/0106453 | A1 * | 4/2009 | Miura | 709/245 |
| 2010/0241762 | A1 * | 9/2010 | Deutsch et al. | 709/245 |
| 2011/0270964 | A1 * | 11/2011 | Huang et al. | 709/224 |
| 2012/0117229 | A1 * | 5/2012 | Van Biljon et al. | 709/224 |

* cited by examiner

*Primary Examiner* — Dustin Nguyen
*Assistant Examiner* — Hao Nguyen
(74) *Attorney, Agent, or Firm* — James E. Goepel

(57) ABSTRACT

A server hosting system provides managed servers for tenants of the server hosting system. Managed servers for different tenants can have the same IP addresses and fully-qualified domain names (FQDNs). Furthermore, the server hosting system provides routers for the tenants. The router for a tenant can receive a Domain Name System (DNS) update message. The DNS update message is a request for a DNS server to associate a tenant-side FQDN with a tenant-side IP address. This tenant-side IP address can concurrently be an IP address of a managed server of another tenant. In response to receiving the DNS update request, the router sends a DNS data message to a management system for the server hosting system. The DNS data message indicates the IP address, the tenant-side FQDN, and an IP address only associated with the given tenant.

16 Claims, 9 Drawing Sheets

SNOOPING DNS MESSAGES IN A SERVER HOSTING SYSTEM PROVIDING OVERLAPPING ADDRESS AND NAME SPACES

TECHNICAL FIELD

The present disclosure relates generally to operation and management of server hosting systems.

BACKGROUND

A vendor can implement and maintain a server hosting system. The server hosting system provides servers for use by multiple customers, called tenants. Computing devices in the server hosting system are located at one or more locations remote from the tenants. For instance, the computing devices in the server hosting system can be located at a premises occupied by the vendor. Use of server hosting systems is growing in popularity because a server hosting system can enable a tenant to divide the cost of implementing, maintaining, and running servers with other tenants.

A server provided by a server hosting system is sometimes referred to as a managed server. A server hosting system can include a dedicated computing device that exclusively provides an individual managed server for a tenant. Alternatively, the server hosting system can include a computing device that provides multiple virtual managed servers. In this alternative scenario, each of the virtual managed servers functions like a separate server, even though the virtual managed servers are provided by a single computing device.

Ideally, a tenant is able to use a managed server in a manner similar to that in which the tenant would use a server on the tenant's premises (i.e., an on-premises server). For example, the tenant may be able to use a managed server to host the tenant's intranet website. In another example, the tenant may be able to use a managed server to host a tenant's email system. As a consequence of enabling a tenant to use a managed server in a manner similar to that in which the tenant would use an on-premises server, it should appear to the tenant as though there were no other tenants of the server hosting system, and as though the managed servers are local to that tenant.

SUMMARY

As part of enabling a given tenant to use a managed server in a manner similar to that in which the given tenant would use an on-premises server, the given tenant may wish to assign a particular Internet Protocol (IP) address to the managed server. In some circumstances, that particular IP address may already be assigned to a managed server associated with another tenant. To ensure that the server hosting system is able to communicate with individual managed servers, each managed server may need a unique IP address. Consequently, conventional managed server systems may prevent the given tenant from assigning the particular IP address to the managed server. Preventing the given tenant from assigning the particular IP address to the managed server means that the given tenant cannot use the managed server in the manner in which the given tenant would use an on-premises server. That is, it breaks the illusion that there are no other tenants of the server hosting system. Similar situations can arise when tenants attempt to assign arbitrary fully-qualified domain names to managed servers.

In accordance with the following disclosure, the above and other issues are addressed by the following:

In a first aspect, a method is disclosed. The method includes receiving a first Domain Name System (DNS) update request at a tenant router in a server hosting system. The first DNS update request requests a DNS server to associate a first tenant-side fully-qualified domain name (FQDN) with a first tenant-side IP address. The server hosting system comprises one or more computing devices that provide the tenant router, a first managed server, and a second managed server. The tenant router and the first managed server are associated with a first tenant of the server hosting system. The second managed server is associated with a second tenant of the server hosting system. The first tenant-side IP address is concurrently an IP address of the first managed server and the second managed server. The method also comprises, in response to receiving the first DNS update request, sending a first DNS data message from the tenant router to a management system for the server hosting system. The first DNS data message indicates the first tenant-side IP address, the first tenant-side FQDN, and a router IP address. The router IP address is associated with the first tenant but not the second tenant.

In a second aspect, a computing device that comprises one or more network interfaces. The one or more network interfaces receives one or more packets containing data representing a first Domain Name System (DNS) update request. The first DNS update request requests a DNS server to associate a first tenant-side fully qualified domain name (FQDN) with a first tenant-side IP address. The first tenant-side IP address is concurrently an IP address of a first managed server in the server hosting system and an IP address of a second managed server in the server hosting system. The first managed server is associated with a first tenant of the server hosting system. The second managed server is associated with a second tenant of the server hosting system. The one or more packets have destination address fields specifying an IP address of the DNS server. The one or more network interfaces sends a first DNS data message to a management system of the server hosting system in response to the first DNS update request. The first DNS data message indicates the first tenant-side IP address, the first tenant-side FQDN, and a router IP address. The router IP address is associated with the first tenant but not the second tenant.

In a third aspect, a computer storage medium includes computer-executable instructions. Execution of the computer-executable instructions by a computing device in a server hosting system causes the computing device to provide a tenant router. The server hosting system also comprising one or more computing devices that provide a first managed server, a second managed server, and a third managed server. The first managed server is associated with a first tenant of the server hosting system. The second managed server is associated with a second tenant of the server hosting system. The tenant router receives one or more packets from a first VLAN. The one or more packets comprise data representing a first Domain Name System (DNS) update request. The first VLAN is associated with the first tenant. The second managed server is associated with the second tenant of the server hosting system. The first DNS update request requests a DNS server to associate a tenant-side fully-qualified domain name (FQDN) with a tenant-side IP address. The tenant-side IP address is concurrently an IP address of the first managed server and the second managed server. The tenant-side FQDN is concurrently a FQDN of the first managed server and the third managed server. The one or more packets have destination address fields specifying an IP address of the DNS server.

The tenant router also sends, in response to receiving the first DNS update request, a first DNS data message on a second VLAN. The tenant router and a management system for the server hosting system are hosts on the second VLAN. The first DNS data message indicates the tenant-side IP address, the tenant-side FQDN, and a router IP address. The router IP address is associated with the first tenant but not the second tenant. In addition, the tenant router receives a given packet on the second VLAN. The given packet has a destination address field specifying a management-side IP address. The management-side IP address is in a management-side IP address range. The management-side IP address is associated with a cloud of the server hosting system. The management-side IP address range does not overlap with management-side IP address ranges for other clouds of the server hosting system. The tenant router also replaces the management-side IP address specified by the destination address field of the given packet with the tenant-side IP address. After replacing the management-side IP address specified by the destination address field, the tenant router sends the given packet on the first VLAN.

DETAILED DESCRIPTION

Figure 1:
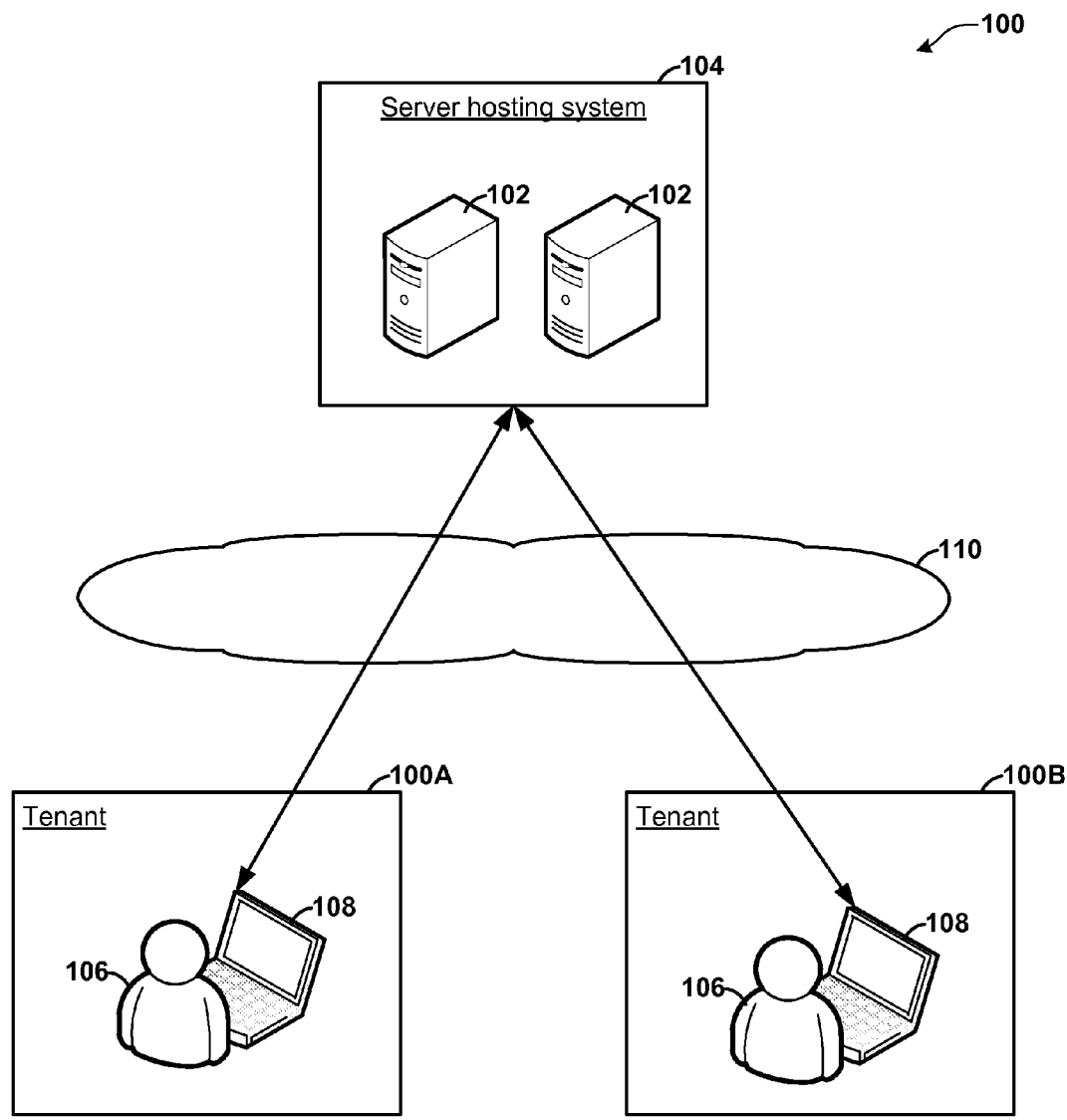
FIG. 1 is a block diagram illustrating an example embodiment in which multiple tenants use managed servers provided by a server hosting system.

Various embodiments will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general, the present disclosure relates to ways to enable tenants of a server hosting system to select IP addresses and domain names for their managed servers in the server hosting system. The ability of tenants to select IP addresses and fully-qualified domain names (FQDNs) for their managed servers allows the tenants to use their managed servers in ways that tenants would use equivalent on-premises servers. As described in this patent disclosure, routers forward DNS data messages to a management system of the server hosting system. The DNS data messages specify IP addresses and FQDNs assigned to managed servers. The management system can use IP addresses and FQDNs of the managed servers to establish unique IP addresses and unique FQDNs for the managed servers. The management system can use these unique IP addresses and unique FQDNs when communicating with the managed servers.

FIG. 1 is a block diagram illustrating an example embodiment in which multiple tenants 100A, 100B use managed servers 102 provided by a server hosting system 104. The patent document can refer collectively to the tenants 100A and 100B as the tenants 100. Although the example of FIG. 1 shows only two tenants 100 and two managed servers 102, it should be appreciated that additional tenants can use managed servers provided by the server hosting system 104. It should also be appreciated that the server hosting system 104 can provide additional managed servers.

Each of the tenants 100 is an entity. The tenants 100 can be various types of entities. For example, one or more of the tenants 100 can be business entities, non-profit entities, individual people, government organizations, and so on. Each of the tenants 100 is associated with at least one user 106. The tenants 100 can be associated with the users 106 in various ways. For example, one or more of the users 106 can be employees, agents, users, contractors, or customers of the tenants 100. In other examples, the users 106 can have other relationships with the tenants 100.

The users 106 use computing devices 108. The computing devices 108 can be a variety of different types of computing devices. For example, the computing devices 108 can be personal computers, laptop computers, handheld computers, tablet computers, smart phones, in-car computers, gaming consoles, television set-top boxes, thin-client computers, and other types of computing devices. In some embodiments, one or more of the computing devices 108 are of the types described below with regard to FIG. 9.

The server hosting system 104 includes one or more computing devices. For example, the server hosting system 104 can include one or more standalone server devices, blade server devices, data storage devices, personal computers, mainframe computers, routers, switches, intrusion detection devices, firewall devices, bridges, and other types of computing devices. In some embodiments, one or more of the computing devices in the server hosting system 104 are of the types described below with regard to FIG. 9.

The computing devices of the server hosting system 104 operate to provide the managed servers 102. The computing devices of the server hosting system 104 can operate in various ways to provide the managed servers 102. For example, a computing device in the server hosting system 104 can execute computer-executable instructions that cause the computing device to provide one of the managed servers 102. In another example, a computing device in the server hosting system 104 can include one or more application-specific integrated circuits (ASICs) that operate to provide one of the managed servers 102.

In some embodiments, single computing devices in the server hosting system 104 can provide multiple ones of the managed servers 102 for use by the same or different ones of the tenants 100. In this case, the multiple managed servers provided by a single computing device are "virtual" managed servers. For example, one of the computing devices in the server hosting system 104 can run VMware® software. In this example, the VMware® software provides an operating environment in which multiple virtual managed servers run. In some embodiments, a single computing device of the server hosting system 104 can provide a single one of the managed servers 102 that is dedicated for use by one of the tenants 100.

The computing devices 108 used by the users 106 communicate with the server hosting system 104 via a communication network 110. The communication network 110 can include various types of communication networks. For example, the communication network 110 can include the Internet. In another example, the communication network 110 can include one or more wide-area networks, local-area networks, or other types of networks. The communication network 110 can include one or more wired or wireless communication links between computing devices connected to the communication network 110.

In some embodiments, one or more users who are not necessarily associated with the tenants 100 can use their computing devices to access one or more of the managed servers 102. For example, one of the managed servers 102 may host a public website for one of the tenants 100. In this example, a member of the general public can use his or her computing device to access the managed server to retrieve web pages in the tenant's public website.

Figure 2:
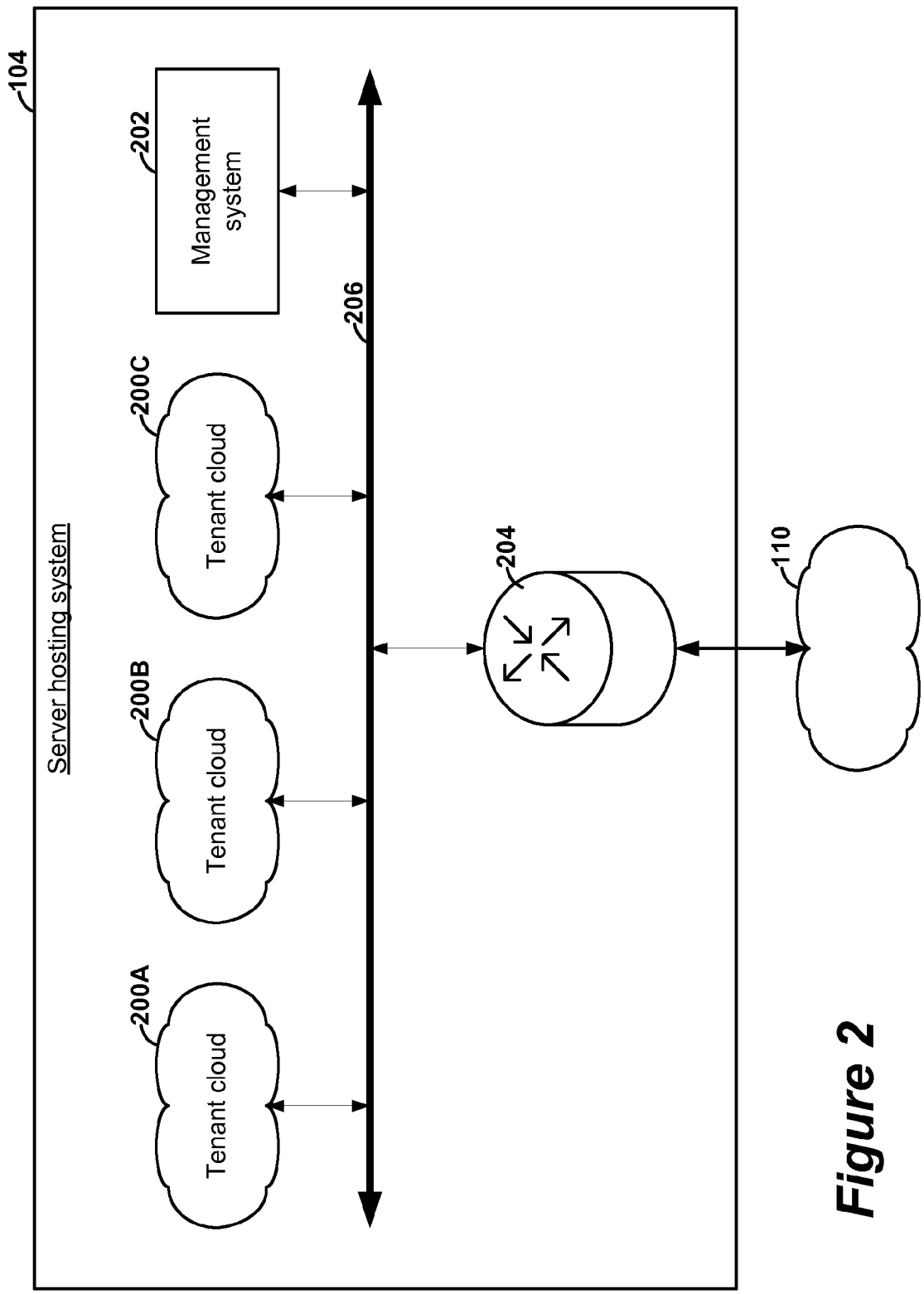
FIG. 2 is a block diagram illustrating example details of the server hosting system.
Figure 3:
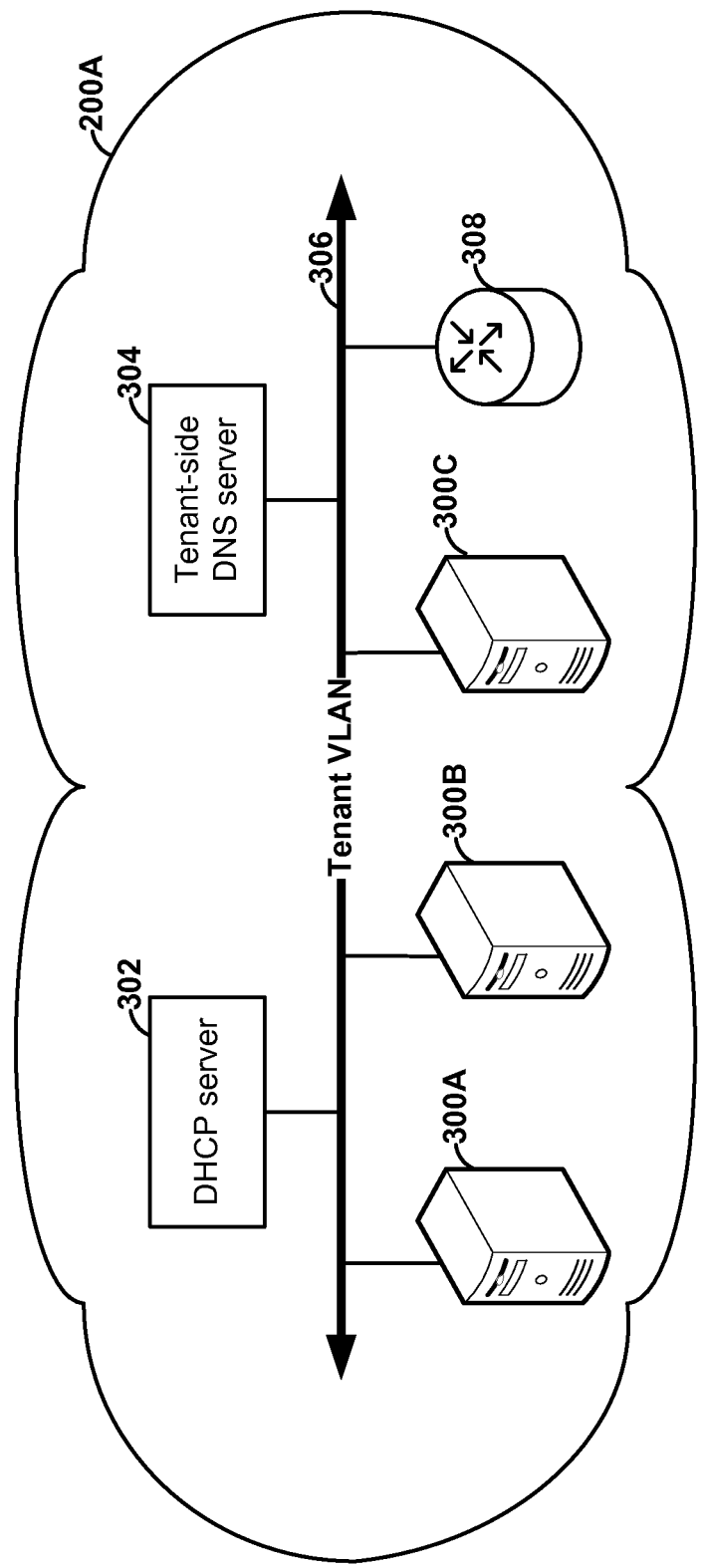
FIG. 3 is a block diagram illustrating example details of a tenant cloud in the server hosting system.

FIG. 2 is a block diagram illustrating example details of the server hosting system 104. As illustrated in the example of FIG. 2, the server hosting system 104 includes tenant clouds 200A, 200B, and 200C. The instant disclosure refers to the tenant clouds 200A, 200B, and 200C collectively as the tenant clouds 200. Each of the tenant clouds 200 is associated with one of the tenants 100. In some embodiments, one of the tenants 100 can be associated with multiple ones of the tenant clouds 200. Although the example of FIG. 3 shows the server hosting system 104 as including only three tenant clouds, it should be appreciated that the server hosting system 104 can include more or fewer tenant clouds.

Each of the tenant clouds 200 is associated with a separate tenant-side Internet Protocol (IP) address range. For example, the tenant cloud 200A can be associated with the tenant-side IP address range 192.162.102.0/24 and the tenant cloud 200B can be associated with the tenant-side IP address range 192.102.103.0/24. The tenant-side IP addresses ranges for the tenant clouds 200 can overlap. For example, the tenant cloud 200A can be associated with the tenant-side IP address range 192.162.102.0/24 and the tenant cloud 200C can also be associated with the tenant-side IP address range 192.162.102.0/24. In some embodiments, the tenants 100 can select the tenant-side IP address ranges for their tenant clouds.

Each of the tenant clouds 200 includes one or more managed servers. Each started managed server has a tenant-side IP address. Managed servers use their tenant-side IP addresses as their IP addresses for communicating with other hosts. Each started managed server's tenant-side IP address is within the tenant-side IP address range of the managed server's tenant cloud. For example, if the tenant-side IP address range for the tenant cloud 200A is 192.162.102.0/24, a managed server in the tenant cloud 200A can have the tenant-side IP address 192.162.102.04, but not the tenant-side IP address 53.201.23.14.

No two managed servers within a single one of the tenant clouds 200 are allowed to have the same tenant-side IP address. For example, a first managed server in the tenant cloud 200A is not allowed to have the tenant-side IP address 192.168.102.34 if a second managed server in the tenant cloud 200A already has the tenant-side IP address 192.168.102.34. However, the system and methods disclosed herein allow managed servers in different ones of the tenant clouds 200 to concurrently have the same or different tenant-side IP addresses. For example, a managed server in the tenant cloud 200A can have the tenant-side IP address 192.168.102.34 and a managed server in the tenant cloud 200B can concurrently have the tenant-side IP address 192.168.102.34.

A tenant-side FQDN is a FQDN assigned by a tenant to a managed server. A tenant-side FQDN is a character string comprising a prefix and a DNS suffix. The tenants 100 can assign tenant-side FQDNs having different prefixes to different managed servers. In some embodiments, each of the tenants 100 is associated with a different DNS suffix. Thus, each of the tenant-side FQDNs for managed servers associated with a given tenant can have different prefixes, but have the same DNS suffix.

No two managed servers within a single one of the tenant clouds 200 are allowed to have the same tenant-side FQDN. For example, a first managed server in the tenant cloud 200A is not allowed to have the tenant-side FQDN "intranet.home" if a second managed service in the tenant cloud 200A already has the tenant-side FQDN "intranet.home." However, the system and methods disclosed herein allow managed servers in different ones of the tenant clouds 200 to concurrently have the same or different tenant-side FQDNs. For example, a managed server in the tenant cloud 200A can have the tenant-side FQDN "intranet.home" and a managed server in the tenant cloud 200B can concurrently have the tenant-side FQDN "intranet.home."

The server hosting system 104 also includes a management system 202. The management system 202 performs management functions for the server hosting system 104. The management system 202 is not associated with any one of the tenants 100. One or more computing devices in the server hosting system 104 operate to provide the management system 202. For example, a computing device in the server hosting system 104 can execute computer-executable instructions that cause the computing device to provide the management system 202. Operation of the management system 202 is described in detail elsewhere in this disclosure.

Because the instant system and methods allow managed servers to have the same tenant-side IP addresses, the management system 202 may not be able to use the tenant-side IP addresses to directly communicate with individual managed servers. example, if two managed servers have the same tenant-side IP address and the management system 202 were to send a packet addressed to that tenant-side IP address, it would be unclear which of the two managed servers is the intended recipient of the packet. To help address this issue, in some embodiments each of the tenant clouds 200 is associated with a separate management-side IP address range. For example, the tenant cloud 200A can be associated with the management-side IP address range 64.162.102.0/24 and the tenant cloud 200B can be associated with the management-side IP address range 64.162.103.0/24. The management-side IP address ranges for the tenant clouds 200 do not overlap.

Each tenant-side IP address in each of the tenant-side IP address ranges is mapped to a management-side IP address in its associated management-side IP address range. For example, the tenant cloud 200A and the tenant cloud 200B can both have the tenant-side IP address range 192.162.102.0/ 24. In this example, the tenant cloud 200A can be associated with the management-side IP address range 64.162.102.0/24 and the tenant cloud 200B can be associated with the management-side IP address range 64.162.103.0/24. In this example, a first managed server in the tenant cloud 200A can have the tenant-side IP address 192.162.102.4 and a second managed server in the tenant cloud 200B can also have the tenant-side IP address 192.162.102.4. In this example, the tenant-side IP address 192.162.102.4 for the first managed server can be mapped to the management-side IP address 64.162.102.4 and the tenant-side IP address 192.162.102.4 for the second managed server can be mapped to the management-side IP address 64.162.103.4.

The server hosting system 104 also includes a system router 204 and a system virtual local area network (VLAN) 206. The system VLAN 206 facilitates communication between the management system 202, the system router 204, and the tenant clouds 200. The system VLAN 206 operates in a manner similar to a LAN. In other words, if a host on the system VLAN 206 sends a packet on the system VLAN 206, each host in the system VLAN 206 receives the packet. Each of the tenant clouds 200 acts like a single host on the system VLAN 206. Packets sent within one of the tenant clouds 200 are resent on the system VLAN 206 when the packets are addressed to hosts outside the tenant VLAN. Similarly, packets sent on the system VLAN 206 are resent on one of the tenant clouds 200 when the packets are addressed to hosts in the tenant cloud. The tenant clouds 200 and the management system 202 operate as hosts in the system VLAN 206.

When the server hosting system 104 receives a packet from the communication network 110, the system router 204 routes the packet onto the system VLAN 206. Furthermore, the system router 204 can route packets from the system VLAN 206 to the communication network 110. In various embodiments, the system router 204 can be implemented in various ways. For example, the system router 204 can be implemented using a specialized router device. In this example, the specialized router device routes packets in hardware and/or firmware. In another example, the system router 204 can be implemented using a computing device that is not a specialized router device. In this example, the computing device routes packets using application- or utility-level software.

FIG. 3 is a block diagram illustrating example details of the tenant cloud 200A in the server hosting system 104. As illustrated in the example of FIG. 3, the tenant cloud 200A includes one or more managed servers 300A, 300B, and 300C. This disclosure can refer collectively to the managed servers 300A, 300B, and 300C as the managed servers 300. Although the example of FIG. 3 shows the tenant cloud 200A as including three managed servers, it should be appreciated that the tenant cloud 200A, and other ones of the tenant clouds 200, can include more or fewer managed servers.

The managed servers 300 can be implemented in various ways. For example, one or more of the managed servers 300 can be implemented as a dedicated server device. In another example, one or more of the managed servers 300 can be implemented as a virtual server.

For ease of explanation, this disclosure assumes that the tenant cloud 200A is associated with the tenant 100A. Each of the managed servers 300 provides one or more services for the tenant 100A. The managed servers 300 can provide various types of services. For example, the managed servers 300 can provide website hosting services, transaction processing services, database access services, bulk computing services, email handling services, unified communications services, document management services, and other types of services.

Furthermore, the tenant cloud 200A includes a Dynamic Host Configuration Protocol (DHCP) server 302 and a tenant-side Domain Name System (DNS) server 304. The DHCP server 302 provides a DHCP service that leases tenant-side IP addresses in the tenant-side IP address range for the tenant cloud 200A to hosts in the tenant cloud 200A, such as the managed servers 300. The tenant-side DNS server 304 provides a DNS service that resolves tenant-side FQDNs of hosts in the tenant cloud 200A to tenant-side IP addresses. The DHCP server 302 and the tenant-side DNS server 304 can be implemented in various ways. For example, the DHCP server 302 and/or the tenant-side DNS server 304 can be implemented using individual dedicated computing devices. In another example, the DHCP server 302 and/or the tenant-side DNS server 304 can be implemented as virtual servers.

The tenant cloud 200A includes a tenant VLAN 306. The hosts in the tenant cloud 200A communicate over the tenant VLAN 306 in the manner that hosts on a local-area network communicate with each other. For instance, each of the hosts on the tenant VLAN 306 receive packets sent by each other host on the tenant VLAN 306, regardless of whether they are the intended recipient of the packets. Typically, a host on the tenant VLAN 306 ignores a packet if the host is not the intended recipient of the packet. For example, one of the managed servers 300 can send a packet that is intended for the tenant-side DNS server 304. In this example, the DHCP server 302, the tenant router 308, and the other managed servers 300 receive and ignore the packet. The managed servers 300, the DHCP server 302, the tenant-side DNS server 304, and the tenant router 308 operate as hosts on the tenant VLAN 306.

The tenant cloud 200A also includes a tenant router 308. The tenant router 308 has an IP address. The tenant router 308 routes packets from the tenant cloud 200A to the system VLAN 206. For example, if the tenant router 308 determines that a packet is addressed to a host having an IP address not in the tenant cloud 200A, the tenant router 308 can forward the packet onto the system VLAN 206.

The tenant router 308 also routes packets from the system VLAN 206 to hosts on the tenant VLAN 306. For example, if the tenant router 308 detects a packet on the system VLAN 206 having a destination address field that specifies a management-side IP address in a management-side IP address space of the tenant cloud 200A, the tenant router 308 performs network address translation on the packet. As part of the network address translation, the tenant router 308 identifies the tenant-side IP address mapped to the management-side IP address. As a result of this network address translation, the tenant router 308 updates the destination address field of the packet to specify the identified tenant-side IP address instead of the management-side IP address. After performing the network address translation on the packet, the tenant router 308 sends the packet on the tenant VLAN 306. A host on the tenant VLAN 306 having the identified tenant-side IP address receives the packet from the tenant VLAN 306.

In various embodiments, the tenant router 308 can be implemented in various ways. For example, the tenant router 308 can be implemented as a dedicated computing device, such as a VYATTA® network appliance. In such an exemplary embodiment, the dedicated computing device can have one or more network interfaces for sending and receiving data. In another exemplary embodiment, the tenant router 308 can be implemented as a virtual router running on a computing device in the server hosting system 104. In such an exemplary embodiment, the tenant router 380 can use one or more network interfaces of a computing device to send and receive data.

Each of the tenant clouds 200 in the server hosting system 104 can include details similar to those illustrated for the tenant cloud 200A in the example of FIG. 3. For instance, each of the tenant clouds 200 includes one or more managed servers, a DHCP server, a tenant-side DNS server, a tenant router, and a tenant VLAN.

Figure 4:
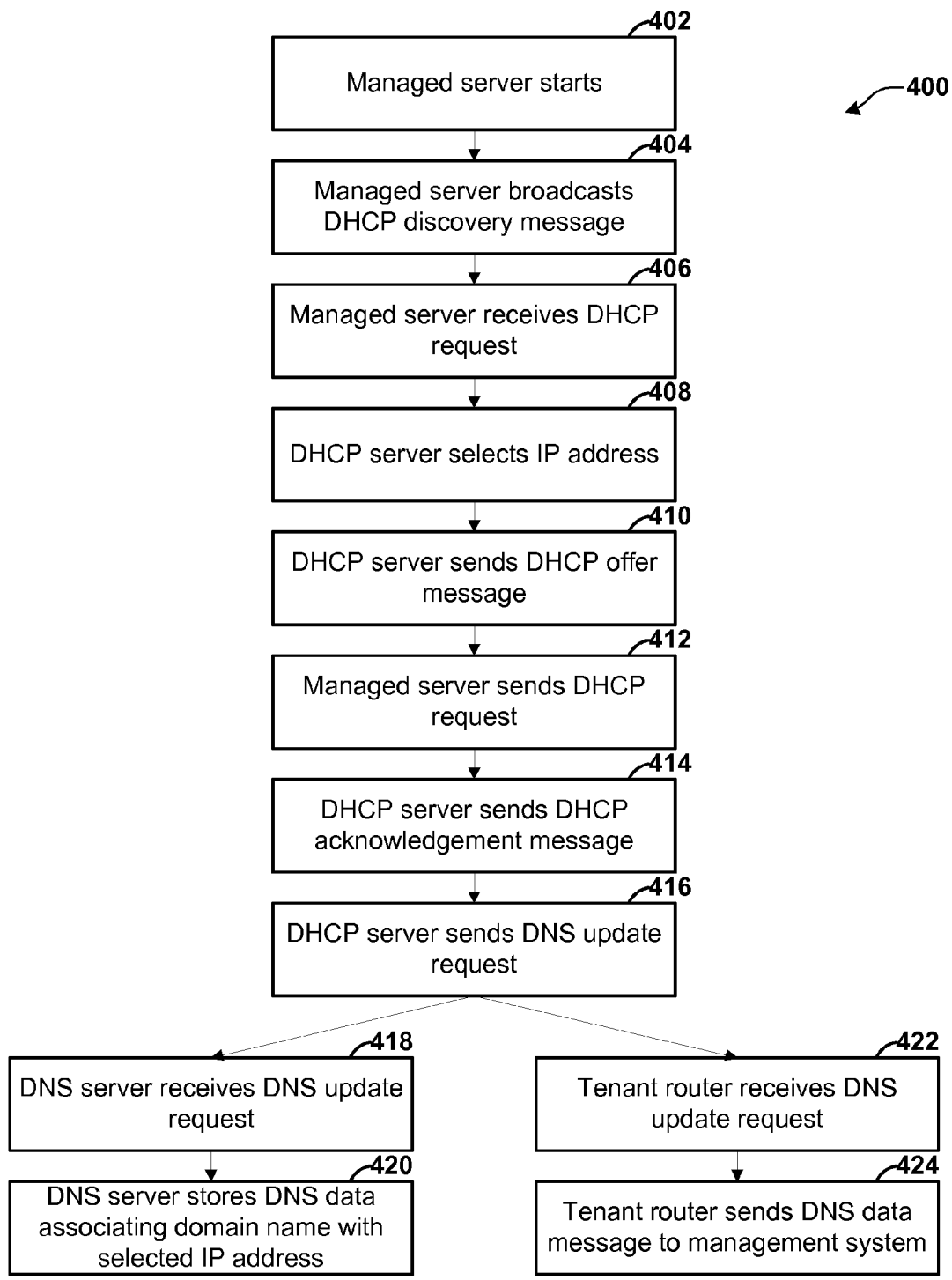
FIG. 4 is a flowchart illustrating an example operation performed by the server hosting system when a managed server starts.

An example operation 400, described with regard to the exemplary embodiment illustrated in FIG. 4, is performed by hosts in the tenant cloud 200A when the managed server 300A in the tenant cloud 200A starts. It should be appreciated that the hosts in the tenant cloud 200A can perform the operation 400 when other ones of the managed servers 300 start. Furthermore, it should be appreciated that hosts in other ones of the tenant clouds 200 can perform the operation 400 when managed servers in those tenant clouds start.

While the server hosting system 104 is operational, the managed server 300A starts (402). The managed server 300A can start in response to various events. For example, the managed server 300A can start when a computing device providing the managed server 300A is turned on or restarted. In another example, the management system 202 can instruct a hypervisor system to start the managed server 300A as a virtual server. In this example, the hypervisor system can start the managed server 300A in response to messages from a user, in response to request load, or in response to other types of events.

When the managed server 300A starts, the managed server 300A does not initially have an IP address. To obtain an IP address, the managed server 300A broadcasts a DHCP discovery message on the tenant VLAN 306 (404). The DHCP discovery message includes a request to obtain an IP address. When the managed server 300A broadcasts the DHCP discovery message, the DHCP server 302 receives the DHCP discovery message (406). In response to the DHCP discovery message, the DHCP server 302 selects an un-leased tenant-side IP address from the tenant-side IP address range of the tenant cloud 200A (408). After selecting an un-leased tenant-side IP address, the DHCP server 302 sends a DHCP offer message on the tenant VLAN 306 (410). The DHCP offer message specifies the selected tenant-side IP address. Subsequently, the managed server 300A receives the DHCP offer message and sends a DHCP request message (412). The DHCP request message specifies the selected tenant-side IP address. The DHCP server 302 receives the DHCP request message and sends a DHCP acknowledgement message on the tenant VLAN 306 (414). In this way, the DHCP server 302 leases the selected tenant-side IP address to the managed server 300A. The DHCP discovery message, the DHCP offer message, the DHCP request message, and the DHCP acknowledgement message specify the same transaction identifier.

In some embodiments, the tenants 100 can select the tenant-side IP address ranges associated with their tenant clouds. For example, the server hosting system 104 can receive input from the tenant 100A indicating a range of tenant-side IP addresses that the DHCP server 302 can assign to managed servers in the tenant cloud 200A. Because the tenants 100 are able to select the tenant-side IP address ranges for their tenant clouds, two or more of the tenants 100 can select overlapping ranges of tenant-side IP addresses. As a result, DHCP servers in the tenant clouds 200 can lease the same IP address to managed servers in their respective tenant clouds 200.

Furthermore, after selecting a tenant-side IP address, the DHCP server 302 sends a DNS update request on the tenant VLAN 306 (416). The DNS update request requests the tenant-side DNS server 304 to associate the tenant-side FQDN of the managed server 300A with the selected tenant-side IP address of the managed server 300A. In other embodiments, the managed server 300A can send the DNS update request after receiving the DHCP acknowledgement message.

In some embodiments, the DNS update request is formatted according to the DNS protocol. Furthermore, the DNS update request includes a source address field and a destination address field. In embodiments where the DHCP server 302 sends the DNS update request, the source address field of the DNS update request specifies an IP address of the DHCP server 302. In embodiments where the managed server 300A sends the DNS update request, the source address field of the DNS update request specifies the tenant-side IP address of the managed server 300A. The destination address field of the DNS update request specifies an IP address of the tenant-side DNS server 304, not an IP address of the tenant router 308. In other words, the tenant-side DNS server 304 is the intended recipient of the DNS update request, not the tenant router 308.

When the DNS update request is sent on the tenant VLAN 306, the tenant-side DNS server 304 receives the DNS update request (418). In response to receiving the DNS update request, the tenant-side DNS server 304 stores DNS records associating the tenant-side FQDN of the managed server 300A with the tenant-side IP address of the managed server 300A (420). Subsequently, the tenant-side DNS server 304 can receive DNS resolution requests specifying the tenant-side FQDN of the managed server 300A. The tenant-side DNS server 304 uses the stored DNS records to generate DNS resolution responses indicating the tenant-side IP address of the managed server 300A.

Furthermore, when the DNS update request is sent on the tenant VLAN 306, the tenant router 308 receives the DNS update request (422). As discussed above, each host in the tenant VLAN 306 receives messages sent by each other host in the tenant VLAN 306. Consequently, the tenant router 308 is able to receive the DNS update request even though the DNS update request was intended to be received by the tenant-side DNS server 304.

In response to receiving the DNS update request, the tenant router 308 sends a DNS data message to the management system 202 via the system VLAN 206 (424). The DNS data message specifies at least the tenant-side IP address of the managed server 300A and the tenant-side FQDN of the managed server 300A. In various embodiments, the tenant router 308 can generate and send the DNS data message in various ways. For example, the tenant router 308 can send the DNS data message by forwarding the received DNS update request onto the system VLAN 206. For instance, the DNS data message can be a request for a DNS server to associate the tenant-side FQDN with the tenant-side IP address.

A process similar to the operation 400 illustrated in the example of FIG. 4 occurs when one of the managed servers 300 detects that its DHCP lease is expiring. For example, the DHCP lease of the managed server 300A can last for three days. At the end of the three days, the managed server 300A can detect that its DHCP lease is expiring. When the managed server 300A detects that its DHCP lease is expiring, the managed server 300A sends a new DHCP request on the tenant VLAN 306. In response to the new DHCP request, the DHCP server 302 can select a new tenant-side IP address from the tenant-side IP address range for the tenant cloud 200A. The DHCP server 302 then leases the selected tenant-side IP address to the managed server 300A. In addition, the DHCP server 302 or the managed server 300A outputs a new DNS update request on the tenant VLAN 306. The tenant-side DNS server 304 stores a new DNS record in response to the new DNS update request. The new DNS record maps the tenant-side FQDN of the managed server 300A to the new tenant-side IP address of the managed server 300A. The tenant router 308 generates a new DNS data message based on the DNS update request and sends the new DNS data message to the management system 202. The new DNS data message specifies the new tenant-side IP address, the tenant-side FQDN, and the IP address of the tenant router 308.

Figure 5:
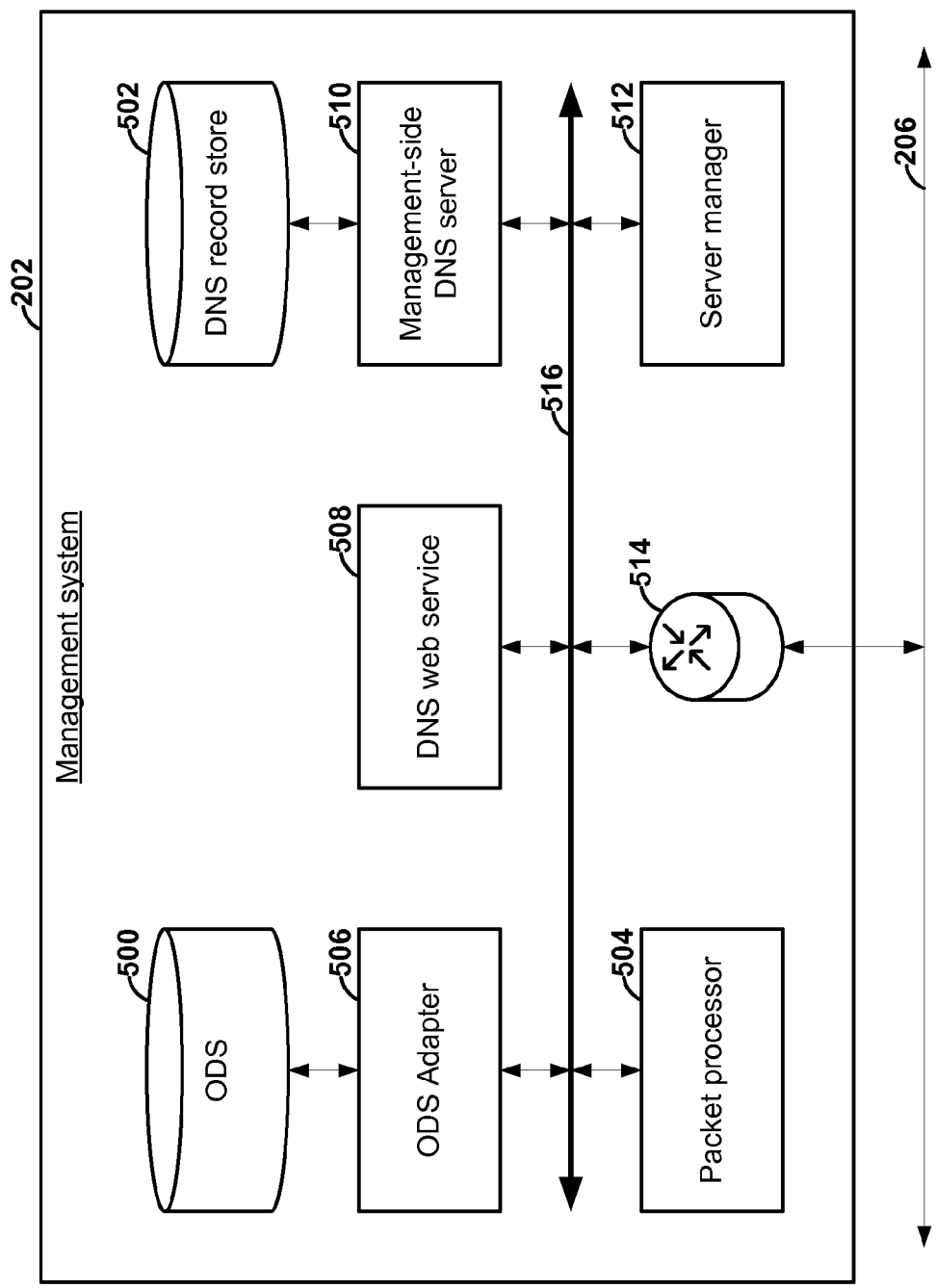
FIG. 5 is a block diagram illustrating example details of a management system of the server hosting system.

FIG. 5 is a block diagram illustrating example details of the management system 202. As illustrated in the example of FIG. 5, the management system 202 includes an operational data store (ODS) 500, a DNS record store 502, a packet processor 504, an ODS adapter 506, a DNS web service 508, a management-side DNS server 510, a server manager 512, a management router 514, and a management VLAN 516.

The ODS 500 stores operational data used by the management system 202 to manage the server hosting system 104. As discussed elsewhere in this patent document, the operational data stored in the ODS 500 indicates the tenant-side IP address ranges of the tenant clouds 200. In some embodiments, the management system 202 can receive input from the tenants 100 specifying the tenant-side IP address ranges for the tenant clouds 200. The operational data stored in the ODS 500 can also indicate the management-side IP address ranges for the tenant clouds 200.

In addition, the operational data stored in the ODS 500 can include address mapping data. The address mapping data indicates mappings between management-side IP addresses in management-side IP address ranges and tenant-side IP addresses in corresponding tenant-side IP address ranges.

In addition, each of the tenant clouds 200 includes a tenant router (e.g., the tenant router 308). Each of the tenant routers has an IP address. None of the tenant routers have the same IP address. The operational data in the ODS 500 can include router mapping data. The router mapping data maps the IP addresses of the tenant routers to tenant clouds containing the tenant routers.

The DNS record store 502 stores DNS records. Each of the DNS records in the DNS record store 502 maps a management-side FQDN for a given managed server to a management-side IP address for the given managed server. The management-side FQDN for the given managed server is not associated with any other managed server in any of the tenant clouds 200 in the server hosting system 104. In other words, the management-side FQDN is unique to the given managed server. The management-side IP address for the given managed server is not associated with any other managed server in any of the tenant clouds 200 in the server hosting system 104. In other words, the management-side IP address is unique to the given managed server.

In various embodiments, the ODS 500 and the DNS record store 502 can be implemented in various ways. For example, the ODS 500 and/or the DNS record store 502 can be implemented as one or more relational databases, flat files, directories, associative databases, or other data structure(s) for storing and retrieving data.

In various embodiments, the packet processor 504, the ODS adapter 506, the DNS web service 508, the management-side DNS server 510, and the server manager 512 can be implemented in various ways. For example, one or more computing devices in the server hosting system 104 can execute computer-executable instructions that cause the computing devices to provide one or more of the packet processor 504, the ODS adapter 506, the DNS web service 508, the management-side DNS server 510, and the server manager 512. For instance, in this example, the DNS web service 508 can be implemented using Java and can run in a Tomcat web server. The Tomcat web server can run on a SPC-uChrg management appliance.

The management VLAN 516 facilitates communication between the packet processor 504, the ODS adapter 506, the DNS web service 508, the management-side DNS server 510, the server manager 512, and the management router 514. The management VLAN 516 operates in the manner of a LAN. Hence, packets sent on the management VLAN 516 are received by each host on the management VLAN 516. In some embodiments, the packet processor 504, the ODS adapter 506, the DNS web service 508, the management-side DNS server 510, and the server manager 512 act as hosts on the management VLAN 516.

The management router 514 receives packets sent on the system VLAN 206. When the management router 514 receives a packet on the system VLAN 206 having a destination address field specifying an address of a host on the management VLAN 516 (e.g., the packet processor 504), the management router 514 forwards the packet onto the management VLAN 516. Moreover, when the management router 514 receives a packet on the management VLAN 516 having a destination address field specifying an address of a host outside the management VLAN 516, the management router 514 can forward the packet onto the system VLAN 206.

The DNS web service 508 provides a web API. The web API includes one or more methods that can be invoked using web services requests. For example, the DNS web service 508 can invoke a method in the web API in response to receiving a SOAP protocol request to invoke the method. Invocation of methods in the web API of the DNS web service 508 cause the DNS web service 508 to output DNS protocol requests on the management VLAN 516. The management-side DNS server 510 processes these DNS protocol requests. Components in the management system 202 can be programmed to send web services requests to the DNS web service 508 instead of directly to the management-side DNS server 510 so that the components do not need to generate DNS protocol requests directly. This can simplify programming of the components.

The server manager 512 can use the ODS adapter 506 and the management-side DNS server 510 for a variety of purposes. For example, the server manager 512 can receive a request from the tenant 100A to shut down the managed server 300A. In this example, the request from the tenant 100A can specify the tenant-side FQDN of the managed server 300A. In this example, the server manager 512 can use the ODS adapter 506 to obtain the management-side FQDN of the managed server 300A from the tenant-side FQDN of the managed server 300A. Furthermore, in this example, the server manager 512 then sends a DNS resolution request specifying the management-side FQDN to the management-side DNS server 510. The resulting DNS resolution response specifies a management-side IP address for the managed server 300A. The server manager 512 can then output one or more packets containing data representing a shutdown request. The management router 514 forwards these packets onto the system VLAN 206. Destination address fields of these packets specify the management-side IP address of the managed server 300A. In this example, when the tenant router 308 receives these packets request, the tenant router 308 replaces the management-side IP address in the destination address fields of these packets with a tenant-side IP address of the managed server 300A. The tenant router then forwards these packets on the tenant VLAN 306. The managed server 300A receives the packets. In this way, the managed server 300A receives the shutdown request and performs an operation to shut down.

Figure 6:
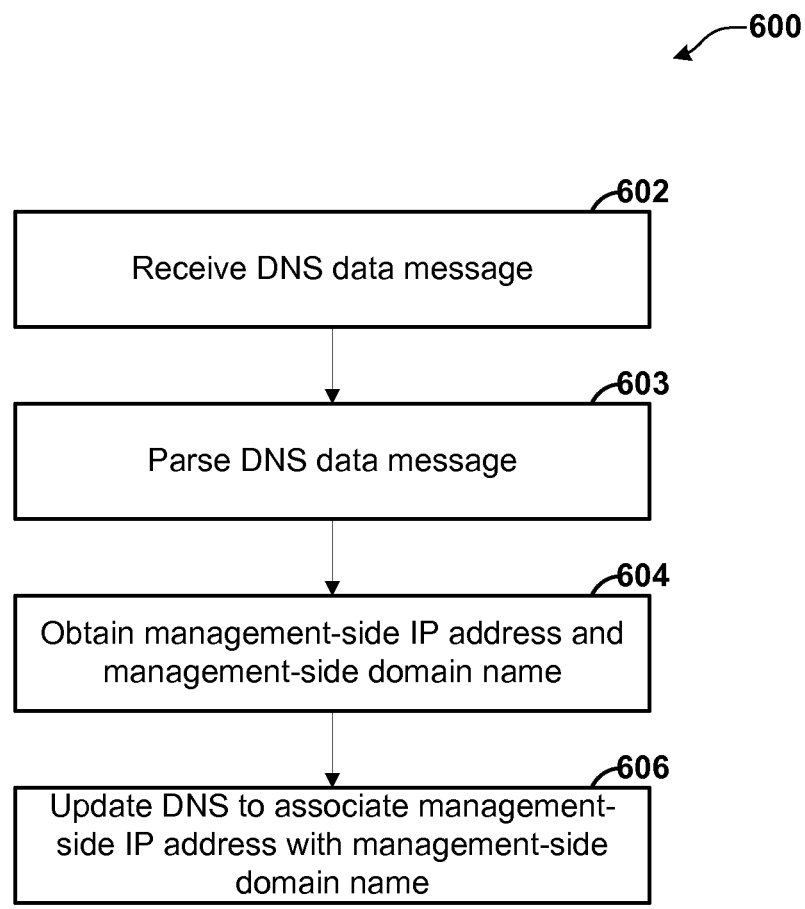
FIG. 6 is a flowchart illustrating an example operation performed by a packet processor in the management system of the server hosting system.

FIG. 6 illustrates an example operation 600 performed by the packet processor 504. As discussed above, each of the tenant clouds 200 includes a tenant router. Each of the tenant routers has an IP address. None of the tenant routers have the same IP address. The tenant routers (e.g., the tenant router 308) in the tenant clouds 200 can send DNS data messages on the system VLAN 206 when managed servers in the tenant clouds 200 start or renew DHCP leases.

When a tenant router sends a DNS data message addressed to the packet processor 504 on the system VLAN 206, the packet processor 504 receives the DNS data message (602). The DNS data message specifies at least a tenant-side IP address of a managed server, a tenant-side FQDN of the managed server, and an IP address of the tenant router that sent the DNS data message. For ease of explanation, this patent document assumes that the DNS data message specifies the tenant-side IP address of the managed server 300A, the tenant-side FQDN of the managed server 300A, and the IP address of the tenant router 308.

In response to receiving the DNS data message, the packet processor 504 parses the DNS data message to extract the tenant-side IP address, the tenant-side FQDN, and the IP address of the tenant router 308 from the DNS data message (603). The packet processor 504 then uses the tenant-side IP address, the tenant-side FQDN, and the IP address of the tenant router 308 to obtain a management-side IP address for the managed server 300A and a management-side FQDN for the managed server 300A (604). The packet processor 504 uses the ODS adapter 506 to obtain the management-side IP address of the managed server 300A and the management-side FQDN of the managed server. No other managed server in any of the tenant clouds 200 of the server hosting system 104 has the management-side IP address. No other managed server in any of the tenant clouds 200 has the management-side FQDN. An example operation performed by the ODS adapter 506 to obtain the management-side IP address of the managed server 300A and the management-side FQDN of the managed server 300A is described below with reference to FIG. 7.

After obtaining the management-side IP address and the management-side FQDN, the packet processor 504 updates one or more DNS records in the DNS record store 502 to associate the management-side FQDN with the management-side IP address (606). In some embodiments, the packet processor 504 communicates with the management-side DNS server 510 to update the DNS records in the DNS record store 502. For example, the packet processor 504 can send a DNS update request to the management-side DNS server 510. In this example, the DNS data message received by the packet processor 504 can be a DNS protocol request to associate the tenant-side FQDN with the tenant-side IP address. Furthermore, in this example, the packet processor 504 can rebuild the DNS data message, substituting the tenant-side FQDN with the management-side FQDN and substituting the tenant-side IP address with the management-side IP address. In this example, the packet processor 504 forwards the rebuilt DNS data message to the management-side DNS server 510. In this example, the packet processor 504 can leave extraneous DNS records out of the rebuilt DNS data message. In some embodiments, such extraneous DNS records can include DNS records referencing IPv6 addresses or reverse-lookup.

Subsequently, the management-side DNS server 510 can receive a DNS resolution request to resolve the management-side FQDN. In response to the DNS resolution request, the management-side DNS server 510 can use the DNS records to generate a DNS resolution response specifying the management-side IP address corresponding to the management-side IP address.

Figure 7:
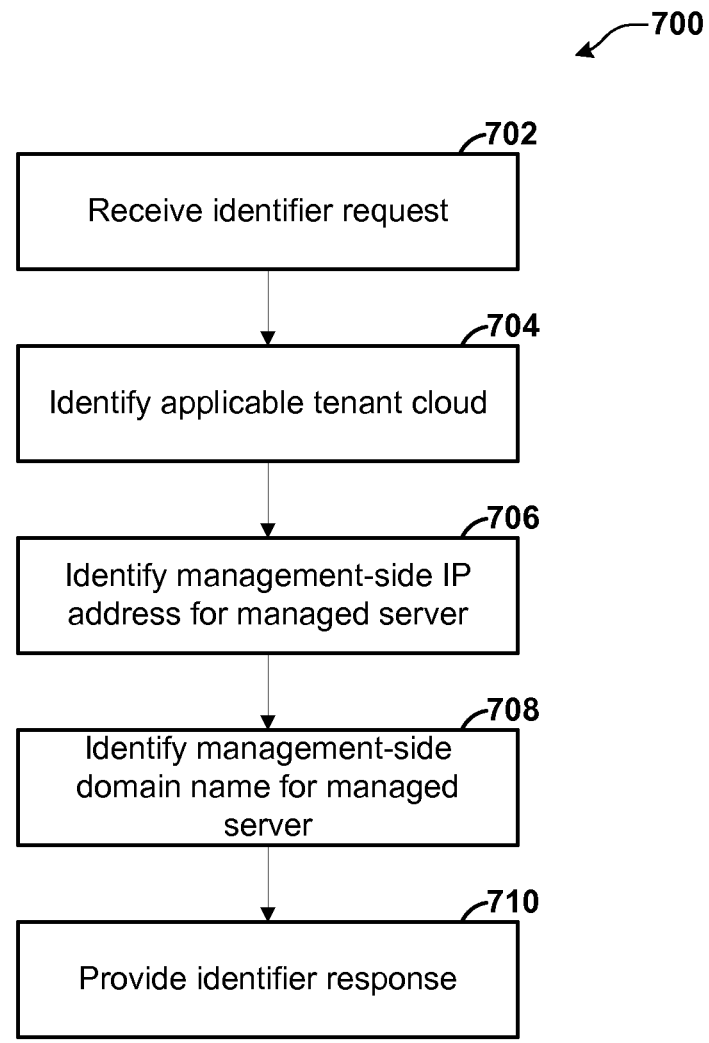
FIG. 7 is a flowchart illustrating an example operation performed by an operational data store adapter to obtain a management-side IP address and a management-side fully-qualified domain name for a managed server.

FIG. 7 is a flowchart illustrating an example operation 700 performed by the ODS adapter 506 to obtain a management-side IP address and a management-side FQDN for the managed server 300A. Although this patent document describes the example of FIG. 7 with reference to the managed server 300A, it should be appreciated that the operation 700 can be performed with regard to other managed servers in any of the tenant clouds 200.

As discussed above, the packet processor 504 uses the ODS adapter 506 to obtain a management-side IP address and a management-side FQDN for the managed server 300A when the packet processor 504 receives a DNS data message. When the packet processor 504 uses the ODS adapter 506 to obtain a management-side IP address and a management-side FQDN for the managed server 300A, the packet processor 504 sends on the management VLAN 516 one or more packets containing data representing an identifier request. In this way, the ODS adapter 506 receives the identifier request from the packet processor 504 (702). The identifier request requests the ODS adapter 506 to provide a management-side IP address and a management-side FQDN for the managed server 300A. The identifier request specifies a tenant-side IP address for the managed server 300A, a tenant-side FQDN for the managed server 300A, and a router IP address. The router IP address is the IP address of a tenant router that sent the DNS data message (i.e., the tenant router 308).

In response to receiving the identifier request, the ODS adapter 506 identifies an applicable tenant cloud (704). As mentioned above, the tenant clouds 200 include tenant routers having different IP addresses. The ODS 500 stores router mapping data that maps IP addresses of tenant routers to tenant clouds. The identifier request specifies the IP address for the tenant router that sent the DNS data message. The ODS adapter 506 uses the router mapping data to identify the applicable tenant cloud based on the IP address of the tenant router that sent the DNS data message.

The ODS adapter 506 then identifies the management-side IP address of the managed server 300A (706). As mentioned briefly above, the ODS 500 stores address mapping data that maps tenant-side IP addresses in the tenant-side IP address range of the applicable tenant cloud to management-side IP addresses in the management-side IP address range of the applicable tenant cloud. The ODS adapter 506 uses this address mapping data to identify the management-side IP address mapped to the tenant-side IP address of the managed server 300A.

In addition, the ODS adapter 506 identifies a management-side FQDN of the managed server 300A (708). In various embodiments, the ODS adapter 506 identifies the management-side FQDN for the managed server 300A in various ways. For example, the ODS 500 can store name mapping data that maps management-side FQDNs to tenant-side FQDNs. In this example, the ODS adapter 506 uses this name mapping data to identify the management-side FQDN of the managed server 300A based on the tenant-side FQDN of the managed server 300A.

In various embodiments, the name mapping data can be created in various ways. For example, when the tenant 100A initially creates the managed server 300A, the tenant 100A provides the tenant-side FQDN for the managed server 300A to server manager 512. When the server manager 512 receives the tenant-side FQDN for the managed server 300A, the server manager 512 creates a management-side FQDN for the managed server 300A. The server manager 512 then uses the ODS adapter 506 to store in the ODS 500 name mapping data that maps a tenant-side FQDN of the managed server 300A to the management-side FQDN of the managed server 300A.

In this example, the server manager 512 can create the management-side FQDN of the managed server 300A in various ways. For instance, the server manager 512 can maintain counters for tenant-side FQDNs. In this example, each time the server manager 512 receives a particular tenant-side FQDN, the server manager 512 increments the counter for the particular tenant-side FQDN. Furthermore, in this example, the server manager 512 selects the management-side FQDN of the managed server 300A by concatenating the tenant-side FQDN of the managed server 300A with the counter for the tenant-side FQDN indicated by the identifier request. In another example, the server manager 512 selects the management-side FQDN of the managed server 300A on a pseudo-random basis.

After identifying the management-side IP address and the management-side FQDN, the ODS adapter 506 provides an identifier response to the packet processor 504 (710). The identifier response specifies the management-side IP address for the managed server 300A and the management-side FQDN for the managed server 300A. In this way, the packet processor 504 is able to obtain the management-side IP address for the managed server 300A and the management-side FQDN for the managed server 300A. The ODS adapter 506 can provide the identifier response to the packet processor 504 by sending on the management VLAN 516 one or more packets containing data representing the identifier response.

In addition to the actions described in the example of FIG. 7, the ODS adapter 506 can perform other actions. For example, the ODS adapter 506 can provide Network Address Translation (NAT) data to tenant routers, such as the tenant router 308. The NAT data indicates mappings between management-side IP addresses and tenant-side IP addresses. For example, the NAT data can indicate that the management-side IP address 172.31.103.27 is associated with the tenant-side IP address 73.201.4.28. In other embodiments, each of the tenant routers is manually configured to store this NAT data.

The ODS adapter 506 can provide the NAT data to tenant routers in response to various events. For example, the ODS adapter 506 can send the NAT data to the tenant router 308 in response to a request from the tenant router 308. In another example, the ODS adapter 506 can forward the NAT data to tenant routers without receiving requests from the tenant routers. In this example, the ODS adapter 506 can forward the NAT data to one or more of the tenant routers when the ODS adapter 506 generates new server address data.

The tenant routers perform network address translation on packets received by the tenant routers. For example, the tenant router 308 can receive a packet on the tenant VLAN 306 in the tenant cloud 200A. In this example, the packet includes a source address field specifying a tenant-side IP address. The tenant router 308 updates the source address field to specify a corresponding management-side IP address instead of the tenant-side IP address. In this example, the tenant router 308 then forwards the packet onto the system VLAN 206. Subsequently, a component in the management system 202 (E.g., the server manager 512) can receive the packet.

In another example of how the tenant routers can perform network address translation, the tenant router 308 can receive a packet on the system VLAN 206 destined for a given one of the managed servers 300. In this example, a component in the management system 202 (e.g., the server manager 512) can initially send the packet. In this example, the packet includes a destination address field specifying a management-side IP address for one of the given managed servers. In this example, the tenant router 308 updates the destination address field to specify a tenant-side IP address for the given managed server instead of the management-side IP address for the given managed server. In this example, the tenant router 308 then sends the packet onto the tenant VLAN 306 in the tenant cloud 200A.

Figure 8:
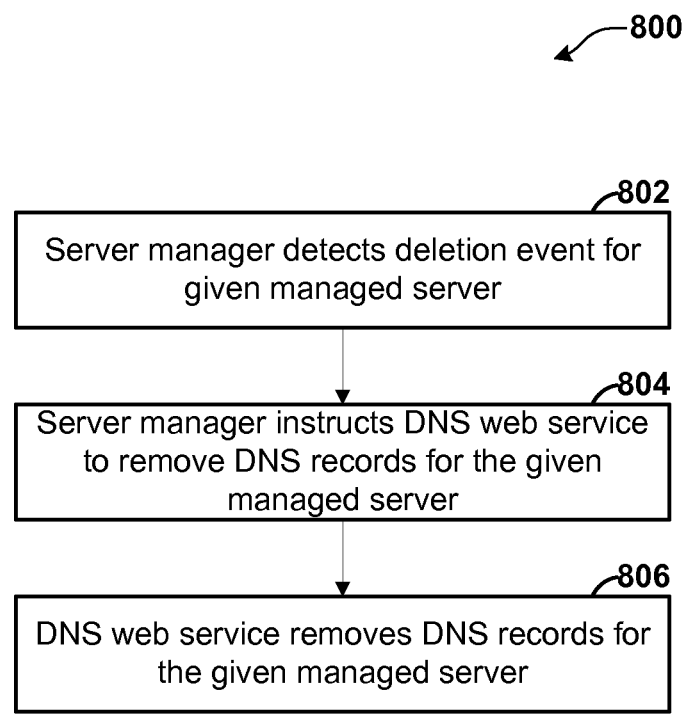
FIG. 8 is a flowchart illustrating an example operation performed by the management system when a managed server is to be deleted.

FIG. 8 is a flowchart illustrating an example operation 800 performed by the management system 202 when a managed server is to be deleted. For ease of explanation, this patent document assumes that the managed server 300A is to be deleted. It should be appreciated that the operation 800 is applicable to other managed servers in the server hosting system 104.

As illustrated in the example of FIG. 8, the operation 800 begins when the server manager 512 detects a deletion event for the managed server 300A (802). The deletion event can be a variety of different types of events. For example, the server manager 512 can detect a deletion event for the managed server 300A when the server manager 512 receives input from the tenant 100A to remove the managed server 300A from the server hosting system 104. In this example, input from the tenant 100A can specify the tenant-side FQDN of the managed server 300A. Furthermore, in this example, the server manager 512 can use the ODS adapter 506 to determine the management-side FQDN corresponding to the tenant-side FQDN.

As part of a process to delete the managed server 300A, the server manager 512 sends a web services request to the DNS web service 508 (804). The web services request requests invocation of a deregister method of a web API provided by the DNS web service 508. The server manager 512 can send the web services request to the DNS web service 508 by sending on the management VLAN 516 one or more packets addressed to the DNS web service 508. These packets contain data representing the web services request.

In some embodiments, the deregister method can take at least the following parameters: DNSserver, FQDomainName, and HostName. The DNSserver parameter is an IP address or a computer name of a DNS server. The DNS web service 508 sends DNS protocol messages to DNS servers indicated by IP addresses or computer names specified in the DNSserver parameter. The FQDomainName parameter is a forward zone domain name. The HostName parameter is the management-side FQDN of a managed server. In the example of FIG. 8, the web services request sent by the server manager 512 specifies an IP address or computer name of the management-side DNS server 510 as the DNSserver parameter. Furthermore, the web services request sent by the server manager 512 specifies a domain name associated with the management system as the FQDomainName parameter. The web services request sent by the server manager 512 can specify the management-side FQDN of the managed server 300A as the HostName parameter.

In response to the web services requests, the DNS web service 508 executes the deregister method (806). When executed, the deregister method removes DNS records for the managed server 300A from the DNS record store 502. The DNS records for the managed server 300A map the management-side FQDN for the managed server 300A to the management-side IP address for the managed server 300A.

To remove the DNS records for the managed server 300A from the DNS record store 502, the deregister method sends one or more DNS protocol requests to the management-side DNS server 510. The DNS protocol requests can be DeleteAllRRsetsFromAName messages. The DNS protocol requests instruct the management-side DNS server 510 to remove the DNS records for the managed server 300A from the DNS record store 502. The DNS web service 508 can send the one or more DNS protocol requests to the management-side DNS server 510 by sending on the management VLAN 516 one or more packets containing data representing the one or more DNS protocol requests.

The following pseudocode illustrates one example implementation of the deregister method:

```
DNSServiceImpl. deregisterDNS(DNSserver, DNSUpdateUser, DNSUpdatePW,
FQDomainName, HostName)
    calls
        DNSUtil.deregisterDNS(DNSserver, DNSUpdatePW, DNSUpdatePW,
FQDomainName, HostName)
            calls
                DNSDeletePacket.createAndSendPacket (FQDomainName, HostName + "."
+ FQDomainName, DNSserver)
                calls
                    DNSDeletePacket.createPacket (FQDomainName, HostName + "." +
FQDomainName)
                    calls
                        Various write routines to construct packet write header,
section record counts, zone section, update record
                    Returns packet
                DNSDeletePacket.SendPacket (packet , DNSserverIP, numTries)
                    Sends packet
                    Returns status
```

Figure 9:
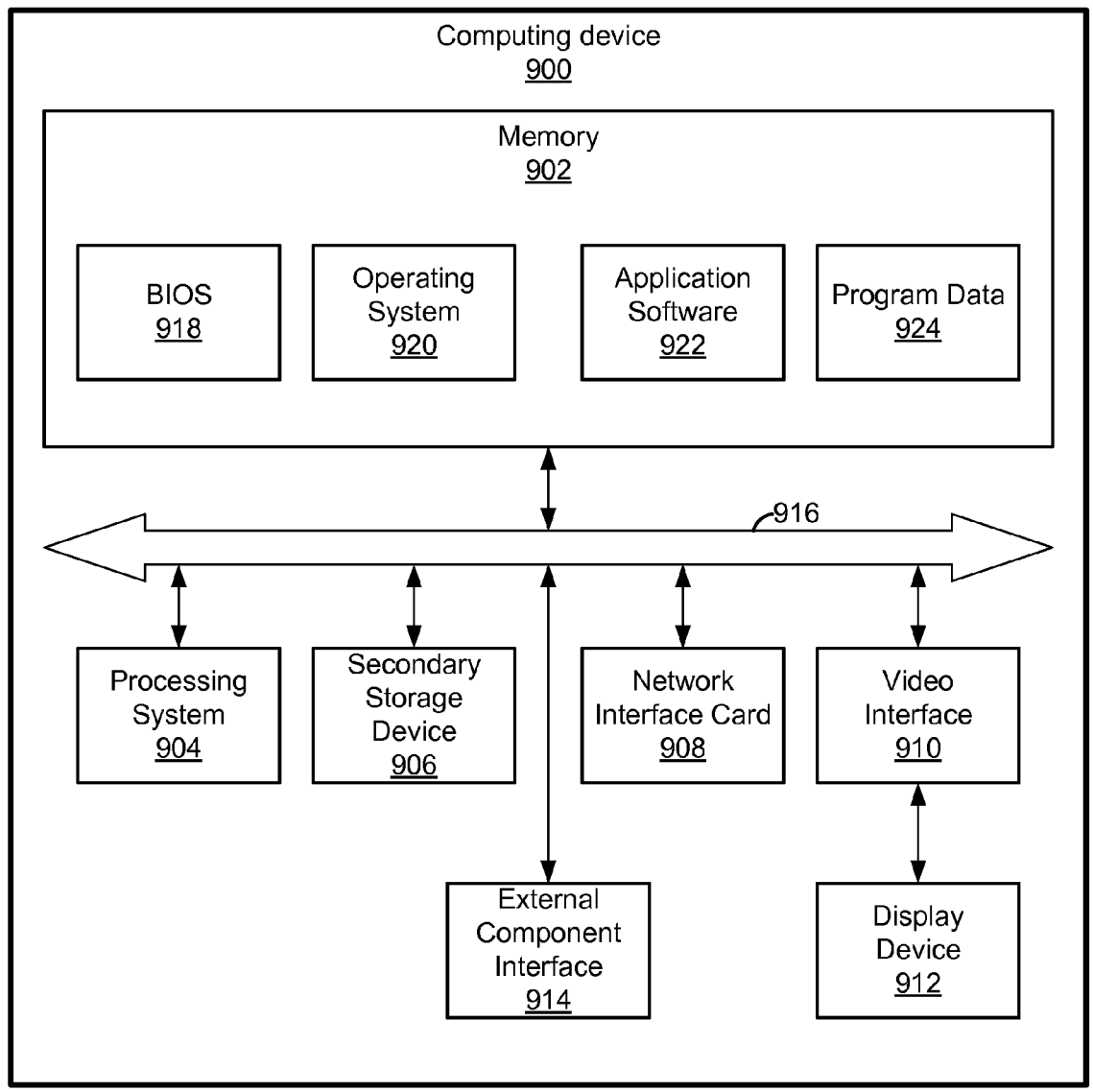
FIG. 9 is a block diagram illustrating example physical details of an electronic computing device.

FIG. 9 is a block diagram illustrating an example computing device 900. In some embodiments, the computing devices 108 and the computing devices in the server hosting system 104 are implemented as one or more computing devices like the computing device 900. It should be appreciated that in other embodiments, the computing devices 108 and computing devices in the server hosting system 104 are implemented using computing devices having hardware components other than those illustrated in the example of FIG. 9.

The term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In the example of FIG. 9, the computing device 900 includes a memory 902, a processing system 904, a secondary storage device 906, a network interface card 908, a video interface 910, a display unit 912, an external component interface 914, and a communication medium 916. The memory 902 includes one or more computer storage media capable of storing data and/or instructions. In different embodiments, the memory 902 is implemented in different ways. For example, the memory 902 can be implemented using various types of computer storage media.

The processing system 904 includes one or more processing units. A processing unit is a physical device or article of manufacture comprising one or more integrated circuits that selectively execute software instructions. In various embodiments, the processing system 904 is implemented in various ways. For example, the processing system 904 can be implemented as one or more processing cores. In another example, the processing system 904 can include one or more separate microprocessors. In yet another example embodiment, the processing system 904 can include an application-specific integrated circuit (ASIC) that provides specific functionality. In yet another example, the processing system 904 provides specific functionality by using an ASIC and by executing computer-executable instructions.

The secondary storage device 906 includes one or more computer storage media. The secondary storage device 906 stores data and software instructions not directly accessible by the processing system 904. In other words, the processing system 904 performs an I/O operation to retrieve data and/or software instructions from the secondary storage device 906. In various embodiments, the secondary storage device 906 includes various types of computer storage media. For example, the secondary storage device 906 can include one or more magnetic disks, magnetic tape drives, optical discs, solid state memory devices, and/or other types of computer storage media.

The network interface card 908 enables the computing device 900 to send data to and receive data from a communication network. In different embodiments, the network interface card 908 is implemented in different ways. For example, the network interface card 908 can be implemented as an Ethernet interface, a token-ring network interface, a fiber optic network interface, a wireless network interface (e.g., WiFi, WiMax, etc.), or another type of network interface.

The video interface 910 enables the computing device 900 to output video information to the display unit 912. The display unit 912 can be various types of devices for displaying video information, such as a cathode-ray tube display, an LCD display panel, a plasma screen display panel, a touch-sensitive display panel, an LED screen, or a projector. The video interface 910 can communicate with the display unit 912 in various ways, such as via a Universal Serial Bus (USB)

connector, a VGA connector, a digital visual interface (DVI) connector, an S-Video connector, a High-Definition Multimedia Interface (HDMI) interface, or a DisplayPort connector.

The external component interface 914 enables the computing device 900 to communicate with external devices. For example, the external component interface 914 can be a USB interface, a FireWire interface, a serial port interface, a parallel port interface, a PS/2 interface, and/or another type of interface that enables the computing device 900 to communicate with external devices. In various embodiments, the external component interface 914 enables the computing device 900 to communicate with various external components, such as external storage devices, input devices, speakers, modems, media player docks, other computing devices, scanners, digital cameras, and fingerprint readers.

The communications medium 916 facilitates communication among the hardware components of the computing device 900. In the example of FIG. 9, the communications medium 916 facilitates communication among the memory 902, the processing system 904, the secondary storage device 906, the network interface card 908, the video interface 910, and the external component interface 914. The communications medium 916 can be implemented in various ways. For example, the communications medium 916 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 902 stores various types of data and/or software instructions. For instance, in the example of FIG. 9, the memory 902 stores a Basic Input/Output System (BIOS) 918 and an operating system 920. The BIOS 918 includes a set of computer-executable instructions that, when executed by the processing system 904, cause the computing device 900 to boot up. The operating system 920 includes a set of computer-executable instructions that, when executed by the processing system 904, cause the computing device 900 to provide an operating system that coordinates the activities and sharing of resources of the computing device 900. Furthermore, the memory 902 stores application software 922. The application software 922 includes computer-executable instructions, that when executed by the processing system 904, cause the computing device 900 to provide one or more applications. The memory 902 also stores program data 924. The program data 924 is data used by programs that execute on the computing device 900.

Overall, a number of advantages of the methods and systems of the present disclosure exist. For example, sending DNS data messages to the management system of a server hosting system can help the management system learn the IP addresses and FQDNs of managed servers. The management system can use this knowledge when communicating with the managed servers, even if some of the managed servers concurrently have the same IP address or FQDNs. Because the management system can communicate with managed servers even when they concurrently have the same IP address or FQDN, tenants can be allowed to select arbitrary ranges of IP addresses for assignment to their managed servers. Furthermore, tenants may be able to select arbitrary FQDNs for their managed servers. The ability to select such ranges of IP and FQDNs for managed servers can be advantageous because it can let the tenants use their managed servers in the ways that they would use on-premises servers. Additional advantages exist as well.

The various embodiments described above are provided by way of illustration only and should not be construed as limiting. Those skilled in the art will readily recognize various modifications and changes that may be made without following the example embodiments and applications illustrated and described herein. For example, the operations shown in the figures are merely examples. In various embodiments, similar operations can include more or fewer steps than those shown in the figures. Furthermore, in other embodiments, similar operations can include the steps of the operations shown in the figures in different orders. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:

receiving a first Domain Name System (DNS) update request at a tenant router in a server hosting system from a first tenant, the first DNS update request addressed to a DNS server and requesting the DNS server to associate a first tenant-side fully-qualified domain name (FQDN) with a first tenant-side IP address, the server hosting system comprising one or more computing devices that provide the tenant router, a first managed server, and a second managed server, the tenant router and the first managed server associated with the first tenant of the server hosting system, the second managed server associated with a second tenant of the server hosting system, the first tenant-side IP address concurrently being an IP address of the first managed server and the second managed server; and in response to receiving the first DNS update request at the tenant router via a tenant virtual local area network, sending a first DNS data message from the tenant router to a management system for the server hosting system via a system virtual local area network, the first DNS data message indicating the first tenant-side IP address, the first tenant-side FQDN, and a router IP address of the tenant router, the router IP address associated with the first tenant but not the second tenant;

wherein subsequent communications from the first tenant to the first tenant-side IP address are routed to the first managed server and not the second managed server;

wherein receiving the first DNS update request comprises receiving the first DNS update request from a first virtual local-area network (VLAN), wherein the first managed server and the tenant router are hosts on the first VLAN, wherein the second managed server is not a host on the first VLAN, the first VLAN comprising the tenant virtual local area network;

wherein sending the first DNS data message comprises sending the first DNS data message on a second VLAN, the tenant router and the management system being hosts on the second VLAN;

receiving, by the tenant router, a given packet on the second VLAN, the given packet having a destination address field specifying a management-side IP address in a management-side IP address range, the management-side IP address range associated with a tenant cloud, wherein the management-side IP address range does not overlap with management-side IP address ranges for other tenant clouds in the server hosting system;

replacing, by the tenant router, the management-side IP address specified by the destination address field of the given packet with the first tenant-side IP address; and after replacing the management-side IP address specified by the destination address field, sending, by the tenant router, the given packet on the first VLAN.

2. The method of claim 1, wherein the first tenant is associated with a first DNS suffix and the second tenant is associated with a second DNS suffix; and wherein the first tenant-side FQDN includes a prefix and the first DNS suffix, another managed server in the server hosting system having a second tenant-side FQDN, the second tenant-side FQDN including the prefix and a different DNS suffix.

3. The method of claim 1, wherein receiving the first DNS update request comprises receiving one or more packets comprising data representing the first DNS update request, the one or more packets having destination address fields specifying an IP address of the DNS server.

4. The method of claim 1, further comprising:

sending a DNS resolution request to the DNS server, the DNS resolution request specifying the first tenant-side FQDN; and receiving a DNS resolution response from the DNS server, the DNS resolution response specifying the first tenant-side IP address.

5. The method of claim 1, wherein a Dynamic Host Configuration Protocol (DHCP) server is a host on the first VLAN; and wherein the method further comprises: receiving, by the tenant router, a DHCP discovery, message from the first VLAN; and receiving, by the tenant router, a DHCP offer message from the first VLAN, the DHCP offer message specifying the first tenant-side IP address, the DHCP discovery message and the DHCP offer message specifying a same transaction identifier.

6. The method of claim 5, wherein receiving the first DNS update request comprises receiving one or more packets containing data representing the first DNS update request, the one or more packets having source address fields indicating an IP address of the DHCP server.

7. The method of claim 5, further comprising:

receiving, from the first tenant, data representing a tenant-side IP address range; and selecting, by the DHCP server, the first tenant-side IP address from among unused tenant-side IP addresses in the tenant-side IP address range.

8. The method of claim 1, wherein sending the first DNS data message comprises forwarding the first DNS update request on to the second VLAN.

9. The method of claim 1, wherein the router IP address is an IP address of the tenant router.

10. The method of claim 1, further comprising:

after a DHCP lease for the first managed server has expired, receiving a second DNS update request at the tenant router, the second DNS update request requesting the DNS server to associate the first tenant-side FQDN with a second tenant-side IP address; and in response to receiving the second DNS update request, sending a second DNS data message from the tenant router to the management system, the second DNS data message indicating the second tenant-side IP address, the first tenant-side FQDN, and the router IP address.

11. The method of claim 1, wherein the first managed server is a virtual server.

12. A server hosting system comprising:

a computing device that comprises one or more network interfaces, the one or more network interfaces receiving one or more packets containing data representing a first Domain Name System (DNS) update request from a first tenant via a tenant virtual local area network, the first DNS update request addressed to a DNS server and requesting the DNS server to associate a first tenant-side fully qualified domain name (FQDN) with a first tenant-side IP address, wherein the first tenant-side IP address is concurrently an IP address of a first managed server in the server hosting system and an IP address of a second managed server in the server hosting system, the first managed server associated with the first tenant of the server hosting system, the second managed server associated with a second tenant of the server hosting system, wherein the one or more packets have destination address fields specifying an IP address of the DNS server, the one or more network interfaces sending a first DNS data message to a management system of the server hosting system via a system virtual local-area network in response to the first DNS update request, the first DNS data message indicating the first tenant-side IP address, the first tenant-side FQDN, and a router IP address of the tenant router, the router IP address associated with the first tenant but not the second tenant;

wherein the server hosting system comprises a first virtual Local-area network (VLAN) including the tenant virtual local area network, the first managed server and the computing device being hosts on the first VLAN, the second managed server not being a host on the first VLAN; and wherein the server hosting system comprises a second VLAN, the computing device and the management system being hosts on the second VLAN; and wherein the one or more network interfaces of the computing device receive a given packet on the second VLAN, the given packet having a destination address field specifying a management-side IP address, the management-side IP address in a management-side IP address range for a tenant cloud, wherein the management-side IP address range does not overlap with management-side IP address ranges for other tenant clouds of the server hosting system;

wherein the computing device comprises a circuit that replaces the management-side IP address specified by the destination address field of the given packet with the first tenant-side IP address; and wherein after the management-side IP address is replaced, the one or more network interfaces of the computing device send the given packet on the first VLAN.

13. The server hosting system of claim 12, wherein the computing device comprises:

a computer storage medium that stores computer-executable instructions; and a processing unit that executes the computer-executable instructions, execution of the computer-executable instructions causing the computing device to receive the one or more packets and send the first DNS data message.

14. The server hosting system of claim 12, wherein the computing device receives the first DNS update request from the first VLAN.

15. The server hosting system of claim 14, wherein the computing device sends the first DNS data message on the second VLAN.

16. A non-transitory computer storage medium comprising:
computer-executable instructions tangibly stored thereon execution of the computer-executable instructions by a computing device in a server hosting system causing the computing device to provide a tenant router, the server hosting system also comprising one or more computing devices that provide a first managed server, a second managed server, and a third managed server, the first managed server associated with a first tenant of the server hosting system, the second managed server associated with a second tenant of the server hosting system, the tenant router receiving one or more packets from a first virtual Local-area network (VLAN), the one or more packets comprising data representing a first Domain Name System (DNS) update request addressed to a tenant DNS server, the first VLAN associated with the first tenant, the first DNS update request requesting the tenant DNS server to associate a tenant-side fully-qualified domain name (FQDN) with a tenant-side IP address,
wherein the tenant-side IP address is concurrently an IP address of the first managed server and the second managed server,
wherein the tenant-side FQDN is concurrently a FQDN of the first managed server and the third managed server,
wherein the one or more packets have destination address fields specifying an IP address of the tenant DNS server,
the tenant router also sending, in response to receiving the first DNS update request at the tenant router, a first DNS data message on a second VLAN, the tenant router and a management system for the server hosting system being hosts on the second VLAN, the first DNS data message indicating the tenant-side IP address, the tenant-side FQDN, and a router IIP address of the tenant router, the router IP address associated with the first tenant but not the second tenant, the tenant router receiving a given packet on the second VLAN, the given packet having a destination address field specifying a management-side IP address, the management-side IP address in a management-side IP address range, the management-side IP address associated with a cloud of the server hosting system, wherein the management-side IP address range does not overlap with management-side IP address ranges for other clouds of the server hosting system;
the tenant router replacing the management-side IP address specified by the destination address field of the given packet with the tenant-side IP address; and
after replacing the management-side IP address specified by the destination address field, the tenant router sends the given packet on the first VLAN.

* * * * *

UNITED STATES PATENT AND TRADEMARK OFFICE
CERTIFICATE OF CORRECTION

PATENT NO. : 8,825,839 B2  Page 1 of 1
APPLICATION NO. : 12/953779
DATED : September 2, 2014
INVENTOR(S) : Mark S. Brandt et al.

It is certified that error appears in the above-identified patent and that said Letters Patent is hereby corrected as shown below:

On the title page item (75), line 6, "James E. Trevdte"

The correct spelling of his name is: -- James E. TREYDTE --

Signed and Sealed this
Third Day of March, 2015

Michelle K. Lee
*Deputy Director of the United States Patent and Trademark Office*